United States Patent
Hayward et al.

(10) Patent No.: US 11,793,198 B2
(45) Date of Patent: *Oct. 24, 2023

(54) DISINFECTANT COMPOSITION

(71) Applicant: The Procter & Gamble Company, Cincinnati, OH (US)

(72) Inventors: Adam Simon Hayward, Durham (GB); Eva Maria Perez-Prat Vinuesa, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 389 days.

This patent is subject to a terminal disclaimer.

(21) Appl. No.: 16/932,864

(22) Filed: Jul. 20, 2020

(65) Prior Publication Data

US 2021/0029999 A1 Feb. 4, 2021

(30) Foreign Application Priority Data

Jul. 29, 2019 (EP) .................................. 19188867

(51) Int. Cl.
| | |
|---|---|
| C11D 3/32 | (2006.01) |
| C11D 1/94 | (2006.01) |
| C11D 17/04 | (2006.01) |
| C11D 3/33 | (2006.01) |
| C11D 3/20 | (2006.01) |
| A01N 43/40 | (2006.01) |
| A01N 25/08 | (2006.01) |
| C11D 1/62 | (2006.01) |
| C11D 1/88 | (2006.01) |
| C11D 1/92 | (2006.01) |
| C11D 3/30 | (2006.01) |
| C11D 3/37 | (2006.01) |
| C11D 3/48 | (2006.01) |

(52) U.S. Cl.
CPC ............. *A01N 43/40* (2013.01); *A01N 25/08* (2013.01); *C11D 1/62* (2013.01); *C11D 1/88* (2013.01); *C11D 1/92* (2013.01); *C11D 1/94* (2013.01); *C11D 3/2013* (2013.01); *C11D 3/2068* (2013.01); *C11D 3/30* (2013.01); *C11D 3/33* (2013.01); *C11D 3/378* (2013.01); *C11D 3/3723* (2013.01); *C11D 3/3757* (2013.01); *C11D 3/48* (2013.01); *C11D 17/049* (2013.01); *C11D 1/883* (2013.01)

(58) Field of Classification Search
CPC ................ C11D 3/20; C11D 1/88; C11D 1/92
See application file for complete search history.

(56) References Cited

U.S. PATENT DOCUMENTS

| | | | |
|---|---|---|---|
| 8,093,199 B2* | 1/2012 | Johnson | A47L 13/17 510/438 |
| 8,546,317 B2* | 10/2013 | Mertens | C11D 3/3776 510/238 |
| 9,821,066 B2 | 11/2017 | Dokken | |
| 11,512,266 B2* | 11/2022 | Hayward | C11D 1/75 |
| 2007/0179265 A1* | 8/2007 | Albers | C08F 220/54 526/317.1 |
| 2008/0293613 A1* | 11/2008 | Johnson | A47L 13/17 510/438 |
| 2012/0213759 A1* | 8/2012 | Karsten | C11D 1/62 424/94.1 |
| 2013/0177518 A1* | 7/2013 | Nielsen | C11D 1/835 514/634 |
| 2014/0369953 A1* | 12/2014 | Purschwitz | C08G 73/0206 514/718 |
| 2016/0060573 A1* | 3/2016 | Fossum | C11D 3/373 510/327 |
| 2016/0060575 A1* | 3/2016 | Panandiker | C11D 3/373 510/327 |
| 2016/0095592 A1* | 4/2016 | Levinson | A61B 18/1402 606/221 |
| 2016/0143276 A1 | 5/2016 | Lan | |
| 2021/0017471 A1* | 1/2021 | Hayward | C11D 3/26 |
| 2021/0029999 A1* | 2/2021 | Hayward | C11D 1/94 |
| 2021/0032806 A1* | 2/2021 | Wilkinson | C11D 3/48 |
| 2021/0095229 A1* | 4/2021 | Fossum | C11D 3/3788 |

FOREIGN PATENT DOCUMENTS

| | | | | |
|---|---|---|---|---|
| WO | WO-2008059013 A1 * | 5/2008 | | A47L 13/17 |
| WO | WO2013098547 A1 | 7/2013 | | |
| WO | 2014151331 A1 | 9/2014 | | |

OTHER PUBLICATIONS

International Search Report and Written Opinion; Application Ser. No. PCT/US2020/070289; dated Oct. 2, 2020; 12 pages.
Anonymous: "Octenidine dihydrochloride", Academic Dictionaries and Encyclopedias; Nov. 21, 2018; pp. 1-2; Retrieved from the Internet: URL:https://web.archive.org/web/20181121023435/https://enacademic.com/dic.nsf/enwiki/11844380[retrieved on Jan. 22, 2020].
Extended European Search Report; Application No. 19188867.6-1110; dated Apr. 2, 2020; 8 pages.
Hübner,N.-O., et al.; Octenidine Dihydrochloride, a Modern Antiseptic for Skin, Mucous Membranes and Wounds; Skin Pharmacology and Physiology; vol. 23; No. 5; 2010; pp. 244-258.

\* cited by examiner

*Primary Examiner* — Liam J Heincer
*Assistant Examiner* — M. Reza Asdjodi
(74) *Attorney, Agent, or Firm* — Carolyn S. Powell

(57) ABSTRACT

A disinfectant cleaning composition, substantially free of quaternary ammonium antimicrobial actives, the composition comprising: a bispyridinium alkane antimicrobial active and a specific polymer.

10 Claims, No Drawings

DISINFECTANT COMPOSITION

FIELD OF THE INVENTION

The present invention is in the field of disinfectant compositions, in particular the field of disinfectant cleaning compositions. The composition provides biocidal residuality and at the same time good cleaning and shine.

BACKGROUND OF THE INVENTION

Compositions as those described in WO 2016/086012 A1 provide long lasting disinfectant benefits. However, surfaces treated with such compositions can be left with a poor shine profile, a low drying rate and a sticky/tacky feel that connotes lack of cleanness to the user.

WO2013/098547 A1 discloses an antibacterial composition comprising quaternary ammonium compounds to provide surface sanitization or disinfection, these compounds tend to be deposited on the surface as a visible residue, which leaves the user with an impression that the treated surface has not been cleaned well. This is because the surface appears streaky and has poor shine. Moreover, the treated surface can feel slightly sticky, which further leaves an impression with the user of poor cleaning. In addition, quaternary ammonium compounds typically interact with the cleaning surfactants present in the composition. The result is that the antimicrobial efficacy of the composition is reduced, or else, higher levels of the antimicrobial active must be present. The use of high levels of quaternary ammonium antibacterial actives in cleaning products might not be desirable for environmental reasons. Another drawback is that their level is restricted in products to be used on food contact surfaces.

Therefore, a need remains for a disinfectant composition providing good cleaning, shine and long-lasting disinfection. Preferably, the composition would be suitable for surfaces which contact food.

SUMMARY OF THE INVENTION

According to the first aspect of the present invention, there is provided a disinfectant cleaning composition. The composition comprises a bispyridinium alkane antimicrobial active and a polymer. The composition provides biocidal residuality.

According to the second aspect of the invention there is provided the use of the composition of the invention to provide biocidal residuality to a surface, in particular to a hard surface.

According to the third aspect of the invention there is provided an article treated with the composition of the first aspect of the invention. The article is in the form of a disposable or partially reusable substrate comprising one or more nonwoven layers. The article provides sanitization to surfaces, in particular hard surfaces. The article is sometimes herein referred to as "the article of the invention".

The elements of the composition of the invention described in relation to the first aspect of the invention apply mutatis mutandis to the other aspects of the invention.

DETAILED DESCRIPTION OF THE INVENTION

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

As used herein, the terms "microbe" or "microbial" should be interpreted to refer to any of the microscopic organisms studied by microbiologists or found in the use environment of a treated article. Such organisms include, but are not limited to, bacteria and fungi as well as other single-celled organisms such as mould, mildew and algae. Viral particles and other infectious agents are also included in the term microbe.

"Antimicrobial" further should be understood to encompass both microbicidal and microbiostatic properties. That is, the term comprehends microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad-spectrum activity (e.g. against bacteria and fungi). When speaking of efficacy against a particular microorganism or taxonomic rank, the more focused term will be used (e.g. antifungal to denote efficacy against fungal growth in particular). Using the above example, it should be understood that efficacy against fungi does not in any way preclude the possibility that the same antimicrobial composition may demonstrate efficacy against another class of microbes.

Residual biocidal properties refer to achieving at least 99.9% microbial reduction in the Environmental Protection Agency (EPA)-approved 24 hour Residual Self Sanitizing (RSS) test methodology for dried product residues on hard, non-porous surfaces (EPA #01-1A). That is, the compositions of the invention displaying residual biocidal properties are able to deliver at least 99.9% microbial reduction after a 12-abrasion and 5-reinoculation 24 hour testing regime.

Disinfectant Composition

The present invention is directed to a disinfectant composition. The composition comprises a bispyridinium alkane, preferably octenidine dihydrochloride and a polymer.

The composition may further comprise a carrier, preferably water, a surfactant, a pH adjusting agent and a fragrance, among other components. Preferably the composition is in liquid form, more preferably in the form of an aqueous solution, preferably the composition comprises more than 80%, more preferably more than 90% and especially from 95 to 99% by weight of the composition of water. The composition is preferably alkaline and have a pH of from 9 to 14, preferably from 10 to 13.

The composition is formulated having surface disinfection and residual biocidal properties for at least 24 hours, via delivering at least 99.9% microbial reduction in the EPA-approved 24 hour RSS test method (EPA #01-1A) The composition can be applied to a surface by spraying, rolling, fogging, wiping or other means. The composition acts as a surface disinfectant, killing infectious microbes present on the surface for at least 24 hours.

Once dried, the liquid formulation leaves a residual protective film on the surface. The residual film possesses a biocidal property, enabling it to maintain protection of the surface against microbial contamination for an extended time period after its application.

The disinfectant composition imparts a film with the capacity to quickly kill bacteria and other germs for at least 24 hours after deposit of the film on the treated surface. Quick kill generally refers to a time period of about 30 seconds to about 5 minutes. The film will remain on the surface and is durable to multiple touches and wearing of the surface. After the composition is applied to a surface the surface presents a good shine profile.

Antimicrobial Agent

The composition of the invention includes bispyridinium alkanes, such as the ones described in GB1533952. The term bispyridinium alkane comprises the bis[4-(substituted-amino)-1-pyridinium]alkanes of the general formulae (I) or (II)

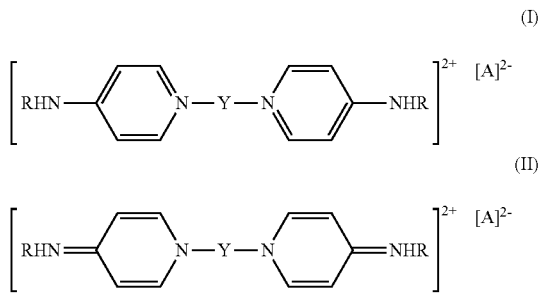

in which

Y is an alkylene or alkyl group having 4 to 18 carbon atoms,

R represents an alkyl group having 6 to 18 carbon atoms or a cycloalkyl group having 5 to 7 carbon atoms or a phenyl group with or without halogen substitution, and A is an anion or several anions.

A may be a monovalent, divalent or a polyvalent anion, for example chloride, bromide, phosphate or orthosilicate. A may also be an organic acid having the formula R4-COO~, wherein R4 is hydrogen, hydroxyl, or C1-C40 alkyl.

Bispyridinium alkanes of the present invention comprise the various prototypes of the compounds of the formula (I) and (II) such as, for example, the ones disclosed in GB1533952 and DE19647692A1.

Other suitable bispyridinium alkanes comprise an organic acid salt of a bispyridine amine where the organic acid contains from about 4 to about 30 carbon atoms, such as, for example, the ones described in WO2014100807. Suitable organic acids include but are not limited to, carboxylic acids, such as (C1-C40) alkanecarboxylic acids which, for example, are unsubstituted or substituted by halogen, saturated or unsaturated dicarboxylic acids, such as hydroxy-carboxylic acids, such as amino acids, such as (C1-C40) alkylsulfonic acids. Additional organic acids from which salts can be derived include, for example, acetic acid, propionic acid, phosphoric acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, glycyrrhizinic acid, salicylic acid, stearic acid, phosphonic acid, trifluoroacetic acid, cyanoacetic acid, 4-cyanobenzoic acid, 2-chlorobenzoic acid, 2-nitrobenzoic acid, phenoxyacetic acid, benzenesulfonic acid. Preferred are salts of stearate such as bispyridinium alkane distearate.

Preferred bispyridinium alkane is octenidine dihydrochloride (R=n-octyl, Y=n-decenyl; A=2×Cl, hereinbelow "octenidine" CAS number 70775-75-6).

The antimicrobial agent need only be present in germicidally effective amounts, which can be as little as 0.001% to less than 1% by weight of the composition. In more preferred compositions, the cleaning composition comprises the antimicrobial agent at a level of from about 0.0025 to about 0.5%, more preferably from 0.005% to 0.15% by weight of the composition.

A germicidally effective amount of the antimicrobial agent typically results in at least a log 4 reduction of *Staphylococcus aureus*, using the method of EN13697 (Chemical Disinfectants Bactericidal Activity Testing), in 5 minutes.

Polymer

The composition preferably comprises from about 0.0005% to about 5% preferably from about 0.001% to about 4% by weight of the composition of the polymer. More preferably from about 0.05% to about 3% by weight of the composition of the polymer. The polymer is either a polyethyleneimine (PEI) or comprises at least one of the monomers listed herein below. If the polymer is not PEI then the polymer comprises at least one monomer selected from the group consisting of:

a) a cationic monomer selected from diallyldimethylammonium chloride (DADMAC); quaternised vinyl imidazole (QVI); quaternised vinyl pyridinium (QVPy); and of the formulae;

or

wherein R1 represents a hydrogen atom or an alkyl group with 1 to 4 C atoms, R2 represents a linear or branched alkylene group with 1 to 12 C atoms and R3, R4 and R5 independently of one another represent a hydrogen atom, an alkyl group with 1 to 18 C atoms, or a phenyl group, and X represents an anion from the group of halogens, sulfates or alkylsulfates, hydroxide, phosphate, acetate, formate or ammonium. Particularly preferred are monomers of type a) in which R1 represents a methyl group, R2 represents a CH2-CH2-CH2 group, and R3, R4 and R5 each represent a methyl group. X— represents a suitable counter-ion such as halide, hydroxide, sulfate, hydrogen sulfate, phosphate, formate or acetate, preferably chloride. The monomer, 3-trimethylammoniumpropylmethacrylamide chloride (MAPTAC), is particularly preferred.

b) A neutral monomer selected from 2-(dimethylamino) ethyl methacrylate (DMAEMA); N-isopropylacrylamide (NIPAM); 2-diethylaminoethylmethacrylate (DEAEMA); 3-dimethylaminopropyl methacrylamide (DMAPMAm); 3-dimethylamino-2,2-dimethylpropylacrylamide (DMADMPAm); C1-C4 alkyl acrylate esters; vinyl imidazole; and vinyl pyridine c) A zwitterionic monomer selected from sulfopropyldimethylammonioethyl methacrylate (SPE), sulfopropyldimethylammoniopropyl methacrylamide (SPP), sulfohydroxylpropyldimethylammoniopropyl methacrylamide (SHPP), sulfohydroxylpropyldimethylammonioethyl methacrylamide (SHPE)

d) Optionally, a co-monomer selected from acrylic acid (AA); methacrylic acid (MA); acrylamide; methacrylamide and 2-acrylamido-2-methylpropane sulfonic acid (AMPS); and e) mixtures thereof.

Preferred polymers comprise 3-trimethylammoniumpropylmethacrylamide chloride (MAPTAC) monomers.

Preferably, the polymer comprises at least two or three monomers selected from a) to d). Preferably, the polymer of the composition of the invention comprises four monomers.

Monomer Component a)

The monomers of this type follow the general formula:

H2C=CR1-CO—NH—R2-N+R3R4R5X— wherein R1 represents a hydrogen atom or an alkyl group with 1 to 4 C atoms, R2 represents a linear or branched alkylene group with 1 to 12 C atoms and R3, R4 and R5 independently of one another represent a hydrogen atom, an alkyl GROUP with 1 to 18 C atoms, or a phenyl group, and X represents an anion from the group of halogens, sulfates or alkylsulfates, hydroxide, phosphate, acetate, formate or ammonium. Particularly preferred are monomers of type a) in which R1 represents a methyl group, R2 represents a CH2-CH2-CH2 group, R3, R4 and R5 each represent a methyl group. X— represents a suitable counter-ion such as halide, hydroxide, sulfate, hydrogen sulfate, phosphate, formate or acetate, preferably chloride. The monomer, 3-trimethylammoniumpropylmethacrylamide chloride (MAPTAC), is particularly preferred.

Monomer Component b)

The second monomer building block contained in the polymers in accordance with the invention is a nitrogen-containing, ethylenically unsaturated compound of the following general formula:

H2C=CR6-CO—NR7R8 wherein R6 represents a hydrogen atom or an alkyl group with 1 to 4 C atoms and R7 and R8, independently of one another, each represent a hydrogen atom, an alkyl group with 1 to 4 C atoms or a C3-C6 cycloalkyl group, with the specification that R7 and R8 do not simultaneously represent hydrogen. Monomer b) encompasses some acrylamides. Particularly preferred is N-isopropylacrylamide, also known under the abbreviation NIPAM.

Monomer Component c)

As the third component c), ethylenically unsaturated acids and their salts such as acrylic or methacrylic acid are suitable. Acrylic acid (AA) is the particularly preferred monomer here. Particularly suitable salts are the alkali metal and ammonium salts.

Monomer Component d)

The monomers of this type follow the general formula:

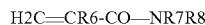

H2C=CR—CO—NH—CR'R"R'"—SO3H and salts thereof, especially the alkali metal and ammonium salts, wherein R, R', R", and R'" independently of one another represent a hydrogen atom or an alkyl(ene) group with 1 to 4 C atoms. Particularly preferred here as the monomer building block of type d) is the molecule with the general formula or H2C=CR—CO—NH—CR'R"R'"—SO3H, wherein especially a derivative, 2-acrylamido-2-methylpropane-sulfonic acid (AMPS) is suitable.

Additional monomer building blocks may be present in the polymers in accordance with the invention in addition to the aforementioned a) to d), wherein here especially nitrogen-containing monomers are preferred. Examples are dimethyldiallylammonium chloride (DADMAC), 2-dimethylaminoethyl(meth)acrylate (DMAE(M)A), 2-diethylaminoethyl(meth)acrylate, 3-dimethylaminopropyl(meth)acrylamide (DMAP(M)A), 3-dimethyl-amino-2,2-dimethylpropylacrylamide (DMADMPA), and the derivatives thereof, which can be obtained by protonation or quaternization, especially 2-trimethyl-ammoniumethyl (meth)acrylate chloride and 3-diethylmethylammoniumpropyl-acrylamide chloride.

The polymers in accordance with the invention are water-soluble, i.e., at least 0.1 g of the polymer is soluble in 100 ml water at 20° C. The polymers are ampholytic, i.e., the polymers have both acid and basic hydrophilic groups and show acidic or basic behaviour depending on the conditions. The polymers in accordance with the invention preferably have a mean molecular weight (weight average molecular weight, Mw), measured by aqueous gel permeation chromatography (GPC) with light scattering detection (SEC-MALLS), in the range of 10,000 to 500,000 Da. Preferably, the molecular weight of the polymers is between 50,000 and 350,000 Da and especially between 100,000 and 250,000 Da. A particularly preferred range may fall between 110,000 and 140,000 Da.

The various monomer building blocks a) to d) preferably occur in certain selected quantitative ratios along with one another. Preferred in each case are polymers that contain the component (b) in excess (both on a molar basis and based on the weight of the components) relative to the components a) and c). Preferred here are polymers in which the molar ratio between the monomers a), b) and c) is in the range from 1:10:1 to 5:10:5 and preferably in the range from 4:10:1 to 4.10:3 and especially in the range form 3:8:2 to 3:8:1. Particularly preferred are especially polymers in which the molar ratio between the components a) and b) is 1:10 to 1:1 and especially 1:5 to 1:1.

Based on mol-% of the respective monomers, preferably 20 to 30% of monomer a), 50 to 70% of monomer b) and 10 to 20% of monomer c) are present. Preferably the monomer building blocks c) and d) are present simultaneously in a molar ratio of 2:1 to 1:2, but particularly preferably in a 1:1 ratio. Particularly preferred polymers with four different monomer building blocks have molar ratios a):b):c):d) of 2:4:1:1 to 1:10:1:1. A particularly preferred ratio is 3:8:1:1.

Preferred polymers in particular are those in which the monomer a) is selected from compounds of the general formula in which R' represents a methyl group, R2 represents an alkylene group with 3 C atoms, R3, R4 and R5 respectively represent methyl group and X represents chloride, the monomer b) is selected from compounds of the general formula in which R6 and R7 represent hydrogen atoms and R8 represents an isopropyl group, and monomer c) represents H2C=CR—CO—NH—CR'R"R'"—SO3H and its salts, especially the alkali metal and ammonium salts, wherein R, R', R", and R'" independently of one another represent a hydrogen atom or an alkyl(ene) group with 1 to 4 C atoms.

Such polymers in accordance with the invention can be produced by various polymerization processes. They can, for example, be produced by solution polymerization or bulk polymerization. Preferably they are produced by solution polymerization, thus polymerization of monomers in solvents and/or water, in which both the monomers and the polymers resulting from them are soluble. In addition, the polymerization can be performed by taking the total quantity of monomer initially or under monomer inflow, batchwise, semi-continuously or continuously. Preferably, the polymerization is performed as batch polymerization with or without monomer inflow. Details for the process to produce the polymers for the composition of the invention are found in US 2007/0179265 A1.

Particularly preferred and therefore another aspect of the present invention is a polymer that is soluble in water at 20° C., containing the four different monomers a), b), c) and d), wherein the monomers a) and b) are present in a molar ratio of 1:1 to 1:10 and in addition the monomers c) and d) are present, wherein as the monomer a) 3-trimethylammonium-propyl-methacrylamide chloride (MAPTAC) is preferred, as the monomer b) N-isopropyl-acrylamide (NIPAM), as monomer c) acrylic acid (AA) and/or methacrylic acid (MA), and as monomer d) 2-acrylamido-2-methyl-1-propanesulfonic acid (AMPS) is preferred, with the specification that the monomer c) is present in the water-soluble polymer in quantities of a maximum of 25 wt % based on the total weight of the water-soluble polymer. Polymers in accordance with the preceding description are preferred in which the weight fraction of monomer c) amounts to less than 15 wt % and especially equal to or less than 10 wt %. A preferred weight range for monomer c) is 5 to 25.

A preferred polymer is water-soluble at 20° C. and contains the monomers MAPTAC, NIPAM, AA and AMPS in weight ratios of 25 to 45% MAPTAC, 40 to 70% NIPAM, 1 to 15% AA and 1 to 15% AMPS, with the specification that the sum of the percentages is 100.

For these polymers as well, the above-described preferred molar ratios are applicable, and also the preferred weight ratios of the monomers within the polymers, i.e., thus the molar ratio between the monomers a), b) and c) or d) lies in the range of 1:10:1 to 5:10:5 and preferably in the range of 4:10:1 to 4:10:3 and especially in the range of 3:8:2 to 3:8:1. A particularly preferred polymer contains the monomers a), b), c) and d) in the molar ratio of 3:8:1:1.

The weight ratio based on the polymer amounts to 20 to 30 wt % of monomer a), 50 to 70 wt % of monomer b) and 10 to 20 wt % of monomers c) and/or d), with the specification that the sum of the percentages is 100. The monomers c) and d), if they are present simultaneously in the polymer, are preferably present in the weight ratio of 1:1. The mean molecular weight of the selected polymers, as described in detail above, is preferably in the range of 10,000 to 500,000.

Alternatively, the polymer can be a polyethyleneimine (PEI), preferred PEIs for use herein are branched, unmodified PEI's, having a molecular weight of from 10,000 to 50,000, more preferably from 15,000 to 40,000 Da.

The polyethyleneimines (PEI's) suitable for use in the composition of the present invention can have the general formula, although the actual formula is not exactly known:

(—NHCH2CH2-)$x$[-N(CH2CH2NH2)CH2CH2-]$y$ wherein x is an integer from 1 to 120,000, preferably from 2 to 60,000, more preferably from 3 to 24,000 and y is an integer from 1 to 60,000, preferably from 2 to 30,000, more preferably from 3 to 12,000. Specific examples of polyethyleneimines are PEI-700, PEI-800, PEI-1000, PEI-1500, PEI-1800, PEI-2000, PEI-2500, PEI-5000, PEI-10,000, PEI-25,000, PEI 50,000, PEI-70,000, PEI-500,000 and the like, wherein the integer represents the average molecular weight of the polymer. PEI's which are designated as such are available through Aldrich.

PEI's are commercially available from the BASF Corporation under the trade name Lupasol® (also sold as Polymin®). These compounds can be prepared as a wide range of molecular weights and product activities. PEI's are also commercially available from Polymer Enterprises or Nippon Shokubai (of Japan) under the trade name Epomin®.

Other frequently used commercial trade names for PEI suitable for use in the present invention include, but are not limited to Polyazinidine®, Corcat®, Montek®, Polymin P® and the like.

Surfactant

The composition of the invention may comprise from 0.1 to 5% by weight of the composition of surfactant. The surfactant contributes to cleaning and spreading of the composition on the surface to be cleaned.

Alcohol Alkoxylated Nonionic Surfactants

Suitable alcohol alkoxylated nonionic surfactants are according to the formula RO-(A)nH, wherein: R is a primary $C_4$ to $C_{18}$, preferably a $C_6$ to $C_{16}$, more preferably a $C_6$ to $C_{14}$ branched or linear alkyl chain, or a $C_6$ to $C_{28}$ alkyl benzene chain; A is an ethoxy or propoxy or butoxy unit, or mixtures thereof, and wherein n is from 1 to 30, preferably from 1 to 15, more preferably from 3 to 12 even more preferably from 3 to 8. Preferred R chains for use herein are the $C_6$ to $C_{16}$ linear or branched alkyl chains.

Suitable branched alkoxylated alcohol may be selected from the group consisting of: $C_4$-$C_{10}$ alkyl branched alkoxylated alcohols, and mixtures thereof. The branched alkoxylated alcohol can be derived from the alkoxylation of $C_4$-$C_{10}$ alkyl branched alcohols selected form the group consisting of: $C_4$-$C_{10}$ primary mono-alcohols having one or more $C_1$-$C_4$ branching groups.

By $C_4$-$C_{10}$ primary mono-alcohol, it is meant that the main chain of the primary mono-alcohol has a total of from 4 to 10 carbon atoms. The $C_4$-$C_{10}$ primary mono-alcohol can be selected from the group consisting of: methyl butanol, ethyl butanol, methyl pentanol, ethyl pentanol, methyl hexanol, ethyl hexanol, propyl hexanol, dimethyl hexanol, trimethyl hexanol, methyl heptanol, ethyl heptanol, propyl heptanol, dimethyl heptanol, trimethyl heptanol, methyl octanol, ethyl octanol, propyl octanol, butyl octanol, dimethyl octanol, trimethyl octanol, methyl nonanol, ethyl nonanol, propyl nonanol, butyl nonanol, dimethyl nonanol, trimethyl nonanol and mixtures thereof.

The $C_4$-$C_{10}$ primary mono-alcohol can be selected from the group consisting of: ethyl hexanol, propyl hexanol, ethyl heptanol, propyl heptanol, ethyl octanol, propyl octanol, butyl octanol, ethyl nonanol, propyl nonanol, butyl nonanol, and mixtures thereof.

Preferably the $C_4$-$C_{10}$ primary mono-alcohol is selected from the group consisting of: ethyl hexanol, propyl hexanol, ethyl heptanol, propyl heptanol, and mixtures thereof.

The $C_4$-$C_{10}$ primary mono-alcohol is most preferably ethyl hexanol, and propyl heptanol.

In the branched alkoxylated alcohol, the one or more $C_1$-$C_4$ branching group can be substituted into the $C_4$-$C_{10}$ primary mono-alcohol at a C1 to C3 position, preferably at the C1 to C2 position, more preferably at the C2 position, as measured from the hydroxyl group of the starting alcohol.

The branched alkoxylated alcohol can comprise from 1 to 14, preferably from 2 to 7, more preferably from 4 to 6 ethoxylate units, and optionally from 1 to 9, preferably from 2 to 7, more preferably from 4 to 6 of propoxylate units.

The branched alkoxylated alcohol is preferably 2-ethyl hexan-1-ol ethoxylated to a degree of from 4 to 6, and propoxylated to a degree of from 4 to 6, more preferably, the alcohol is first propoxylated and then ethoxylated. Another preferred branched alkoxylated alcohols are 2-alkyl-1-alkanols such as alkoxylated $C_{10}$ guerbet alcohols with 1 to 14, preferably from 2 to 7, more preferably from 3 to 6 ethoxylate or ethoxylate-propoxylate units.

Non-limiting examples of suitable branched alkoxylated alcohols are, for instance, Ecosurf® EH3, EH6, and EH9, commercially available from DOW, and Lutensol® XP alkoxylated Guerbet alcohols & Lutensol® XL ethoxylated Guerbet alcohols available from BASF.

Linear alcohol alkoxylated nonionic surfactants preferred herein are alkoxylated nonionic surfactants with a $C_8$, $C_{10}$, $C_{12}$, mixtures of $C_8$ to $C_{10}$, mixtures of $C_{10}$ to $C_{12}$, mixtures of $C_9$ to $C_{11}$ linear alkyl chain and 8 or less ethoxylate units, preferably 3 to 8 ethoxylate units.

Non-limiting examples of suitable linear alkoxylated nonionic surfactants for use herein are Dobanol® 91-2.5 (R is a mixture of $C_9$ and $C_{11}$ alkyl chains, n is 2.5), Dobanol® 91-5 (R is a mixture of $C_9$ to $C_{11}$ alkyl chains, n is 5); Dobanol® 91-10 (R is a mixture of $C_9$ to $C_{11}$ alkyl chains, n is 10); Greenbentine DE60 (R is a C10 linear alkyl chain, n is 6); Marlipal 10-8 (R is a $C_{10}$ linear alkyl chain, n is 8); Neodol 91-8 (R is a mixture of $C_9$ to $C_{11}$ alkyl chains, n is 8); Empilan® KBE21 (R is a mixture of $C_{12}$ and $C_{14}$ alkyl chains, n is 21); Lutensol ON30 (R is $C_{10}$ linear alkyl chain, n is 3); Lutensol ON50 (R is $C_{10}$ linear alkyl chain, n is 5); Lutensol ON70 (R is $C_{10}$ linear alkyl chain, n is 7); Novel 610-3.5 (R is mixture of $C_6$ to $C_{10}$ linear alkyl chains, n is 3.5); Novel 810FD-5 (R is mixture of $C_8$ to $C_{10}$ linear alkyl chains, n is 5); Novel 10-4 (R is $C_{10}$ linear alkyl chain, n is 4); Novel 1412-3 (R is mixture of $C_{12}$ to $C_{14}$ linear alkyl chains, n is 3); Lialethl® 11-5 (R is a $C_{11}$ linear alkyl chain, n is 5); Lialethl® 11-21 (R is a mixture of linear and branched $C_{11}$ alkyl chain, n is 21), or mixtures thereof.

The alkoxylated nonionic surfactant may be a secondary alcohol ethoxylate such as for example the Tergitol™-15-S surfactants having the general formula shown below and commercially available by DOW

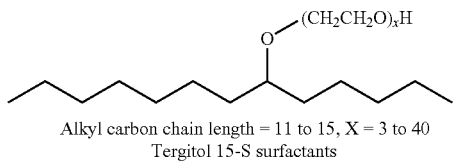

Alkyl carbon chain length = 11 to 15, X = 3 to 40
Tergitol 15-S surfactants

Preferred secondary alcohol ethoxylate surfactants have 3-9 EO units.

Another suitable alkoxylated nonionic surfactant is an alkyl ethoxy alkoxy alcohol, preferably wherein the alkoxy part of the molecule is propoxy, or butoxy, or propoxy-butoxy. More preferred alkyl ethoxy alkoxy alcohols are of formula (II):

Formula (II)

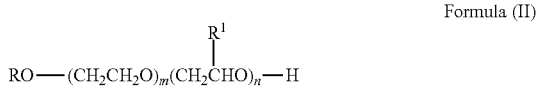

wherein:
R is a branched or unbranched alkyl group having 8 to 16 carbon atoms;
$R^1$ is a branched or unbranched alkyl group having 1 to 5 carbon atoms;
n is from 1 to 10; and m is from 6 to 35.

R is preferably from 12 to 15, preferably 13 carbon atoms. $R^1$ is preferably a branched alkyl group having from 1 to 2 carbon atoms. n is preferably 1 to 5. m is preferably from 8 to 25. Preferably, the weight average molecular weight of the ethoxylated alkoxylated nonionic surfactant of formula (II) is from 500 to 2000 g/mol, more preferably from 600 to 1700 g/mol, most preferably 800 to 1500 g/mol.

The ethoxylated alkoxylated nonionic surfactant can be a polyoxyalkylene copolymer. The polyoxyalkylene copolymer can be a block-heteric ethoxylated alkoxylated nonionic surfactant, though block-block surfactants are preferred. Suitable polyoxyalkylene block copolymers include ethylene oxide/propylene oxide block polymers, of formula (III):

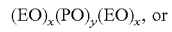

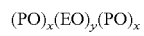

wherein EO represents an ethylene oxide unit, PO represents a propylene oxide unit, and x and y are numbers detailing the average number of moles ethylene oxide and propylene oxide in each mole of product. Such materials tend to have higher molecular weights than most non-ionic surfactants, and as such can range between 1000 and 30000 g/mol, although the molecular weight should be above 2200 and preferably below 13000 to be in accordance with the invention. A preferred range for the molecular weight of the polymeric non-ionic surfactant is from 2400 to 11500 Daltons. BASF (Mount Olive, NJ) manufactures a suitable set of derivatives and markets them under the Pluronic trademarks. Examples of these are Pluronic (trademark) F77, L62 and F88 which have the molecular weight of 6600, 2450 and 11400 g/mol respectively.

Other suitable ethoxylated alkoxylated nonionic surfactants are described in Chapter 7 of Surfactant Science and Technology, Third Edition, Wiley Press, ISBN 978-0-471-68024-6.

Most preferably the alkoxylated nonionic surfactant is selected from the group consisting of: 2-propylheptyl EO8 (Lutensol XL89-BASF); 2-propylheptyl EO5 (Lutensol XL50-BASF); $C_{10}$ alcohol EO5 (Lutensol ON 50-BASF); $C_{10}$-alcohol EO7 (Lutensol ON 70-BASF); $C_8$-$C_{10}$ EO5 (Novel 810 FD5 Sasol); $C_{10}$ EO4 (Novel 10-4 Sasol); Tergitol 15-S-3; Tergitol 15-S-5; Tergitol 15-S-7; and Ethyl hexanol PO5EO6 (Ecosurf EH6-Dow).

Alkyl Polyglucosides

Alkyl polyglucosides are biodegradable nonionic surfactants which are well known in the art, and can be used in the compositions of the present invention. Suitable alkyl polyglycosides can have the general formula $C_nH_{2n+1}O(C_6H_{10}O_5)_xH$ wherein n is preferably from 8 to 16, more preferably 8 to 14, and x is at least 1. Examples of suitable alkyl polyglucoside surfactants are the TRITON™ alkyl polyglucosides from Dow; Agnique PG, Disponil APG and Glucopon alkyl polyglucosides from BASF. Preferred alkyl polyglucoside surfactants are those where n is 8 to 12, more preferably 8 to 10, such as for example Triton CG50 (Dow).

Amine Oxide

Suitable amine oxide surfactants include: $R_1R_2R_3NO$ wherein each of $R_1$, $R_2$ and $R_3$ is independently a saturated or unsaturated, substituted or unsubstituted, linear or branched hydrocarbon chain having from 1 to 30 carbon atoms. Preferred amine oxide surfactants are amine oxides having the following formula: $R_1R_2R_3NO$ wherein R1 is a hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. R1 may be a saturated or unsaturated, substituted or unsubstituted linear or branched hydrocarbon chain.

Highly preferred amine oxides are $C_8$ dimethyl amine oxide, $C_{10}$ dimethyl amine oxide, $C_{12}$ dimethyl amine oxide, $C_{14}$ dimethyl amine oxide, and mixtures thereof $C_8$ dimethyl amine oxide is commercially available under the trade name Genaminox® OC from Clariant; $C_{10}$ dimethyl amine oxide is commercially available under the trade name Genaminox® K-10 from Clariant; $C_{12}$ dimethyl amine oxide is commercially available under the trade name Genaminox® LA from Clariant and of Empigen OB from Huntsman; $C_{14}$ amine oxide is commercially available under the trade name of Empigen OH 25 from Huntsman Other suitable amine oxide surfactants are cocoyldiethoxy amine oxide available under the trade name of Genaminox CHE from Clariant, and cocamydopropyl amine oxide commercially available under the trade name of Empigen OS/A from Huntsman Particularly preferred amine oxide surfactants are $C_{10}$ dimethyl amine oxide such as Genaminox K-10.

Alkyl Glucamide Surfactants

The composition of the invention may comprise an alkyl glucamide surfactant. Glucamide surfactants are non-ionic surfactants in which the hydrophilic moiety (an amino-sugar derivative) and the hydrophobic moiety (a fatty acid) are linked via amide bonds. This results in a chemical linkage, which is highly stable under alkaline conditions. Particularly preferred alkyl glucamide surfactants are N-alkyl-N-acyl-glucamides of the formula (I):

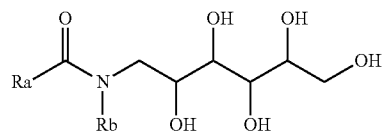
(I)

Wherein Ra is a linear or branched, saturated or unsaturated hydrocarbyl group having 6 to 22 carbon atoms, and Rb is a $C_1$-$C_4$ alkyl group. Particularly preferably, Rb in formula (I) is a methyl group. Non-limiting examples of these glucamide surfactants are: N-octanoyl-N-methylglucamide, N-nonanoyl-N-methylglucamide, N-decanoyl-N-methylglucamide, N-dodecanoyl-N-methylglucamide, N-cocoyl-N-methylglucamide, available under the trade name of GlucoPure Foam from Clariant, N-lauroyl/myristoyl-N-methylglucamide, (available under the trade name of GlucoPure Deg from Clariant, and N-octanoyl/decanoyl-N-methylglucamide, available under the trade name of GlucoPure Wet by Clariant Alkyl Glucamine Surfactants The compositions of the invention may comprise an alkyl glucamine surfactant.

These surfactants are described in EP16184415 and US20190055496.

Zwitterionic and Amphoteric Surfactants

The hard surface cleaning composition may comprise an amphoteric surfactant, a zwitterionic surfactant, and mixtures thereof. Suitable zwitterionic surfactants typically contain both cationic and anionic groups in substantially equivalent proportions so as to be electrically neutral at the pH of use, and are well known in the art. Some common examples of zwitterionic surfactants are described in U.S. Pat. Nos. 2,082,275, 2,702,279 and 2,255,082.

Suitable zwitteronic surfactants include betaines such alkyl betaines, alkylamidobetaine, amidazoliniumbetaine, sulfobetaine (INCI Sultaines) as well as the phosphobetaine.

Suitable betaines are the alkyl betaines of the formula (Ia), the alkyl amido betaine of the formula (Ib), the sulfo betaines of the formula (Ic) and the amido sulfobetaine of the formula (Id);

R1-N+(CH3)2-CH2COO— (Ia)

R1-CO—NH(CH2)3-N+(CH3)2-CH2COO— (Ib)

R1-N+(CH3)2-CH2CH(OH)CH2SO3- (Ic)

R1-CO—NH—(CH2)3-N+(CH3)2-CH2CH(OH)CH2SO3- (Id)

in which R1 is a saturated or unsaturated $C_6$-$C_{22}$ alkyl residue, preferably $C_8$-$C_{18}$ alkyl residue. Particularly preferred are betaines of the formula Ia such as for example N-alkyl-N-dimethyl betaine like the one sold under the trade name of Empigen BB by Huntsman.

Examples of suitable betaines and sulfobetaine are the following designated in accordance with [INCI]: Almondamidopropyl of betaines, Apricotamidopropyl betaines, Avocadamidopropyl of betaines, Babassuamidopropyl of betaines, Behenamidopropyl betaines, Behenyl of betaines, betaines, Canolamidopropyl betaines, Capryl/Capramidopropyl betaines, Carnitine, Cetyl of betaines, Cocamidoethyl of betaines, Cocamidopropyl betaines, Cocamidopropyl Hydroxysultaine, Coco betaines, Coco Hydroxysultaine, Coco/Oleamidopropyl betaines, Coco Sultaine, Decyl of betaines, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl of PG-betaines, Erucamidopropyl Hydroxysultaine, Hydrogenated Tallow of betaines, Isostearamidopropyl betaines, Lauramidopropyl betaines, Lauryl of betaines, Lauryl Hydroxysultaine, Lauryl Sultaine, Milkamidopropyl betaines, Minkamidopropyl of betaines, Myristamidopropyl betaines, Myristyl of betaines, Oleamidopropyl betaines, Oleamidopropyl Hydroxysultaine, Oleyl of betaines, Olivamidopropyl of betaines, Palmam idopropyl betaines, Palmitan idopropyl betaines, Palmitoyl Carnitine, Palm Kernelamidopropyl betaines, Polytetrafluoroethylene Acetoxypropyl of betaines, Ricinoleamidopropyl betaines, Sesam idopropyl betaines, Soyamidopropyl betaines, Stearamidopropyl betaines, Stearyl of betaines, Tallowamidopropyl betaines, Tallowamidopropyl Hydroxysultaine, Tallow of betaines, Tallow Dihydroxyethyl of betaines, Undecylenamidopropyl betaines and Wheat Germamidopropyl betaines.

If the composition comprises a zwitterionic surfactant, it is preferably a betaine of the formula Ia such as for example N-alkyl-N-dimethyl betaine like the one sold under the trade name of Empigen BB by Huntsman alkyl dimethyl betaine.

Amphoteric surfactants can be either cationic or anionic depending upon the pH of the composition. Suitable amphoteric surfactants include dodecylbeta-alanine, N-alkyltaurines such as the one prepared by reacting dodecylamine with sodium isethionate, as taught in U.S. Pat. No. 2,658,072, N-higher alkylaspartic acids such as those taught in U.S. Pat. No. 2,438,091. Other suitable amphoteric surfactants are the products sold under the trade name Miranol by Solvay-Novecare such as, for example, sodium lauroamphoacetate (Miranol Ultra L-32E), sodium stearoampho acetate (Miranol DM), disodium cocoamphodiacetate (Miranol C2m Conc NP), disodium lauroamphodiacetate (Miranol BM Conc), disodium capryloampho dipropionate (Miranol JBS), sodium mixed $C_8$ amphocarboxylate (Miranol JEM Conc), and sodium capryloampho hydroxypropyl sulfonate (Miranol JS). Other non-limiting examples of suitable amphoteric surfactants are disodium capryloamphodiacetate (Mackam 2CY 75-Solvay Novecare), octyliminodipropionate (Ampholak YJH40-Akzo Nobel), sodium lauriminodipropionate (Mirataine H2C-HA-Solvay Novecare), and sodium lauroamphohydroxypropylsulfonate (Mackam LS-Solvay Novecare).

Other suitable additional surfactants can be found in McCutcheon's Detergents and Emulsifiers, North American Ed. 1980.

Anionic Surfactants

If anionic surfactant is present, it is preferably present at low levels, i.e. below 0.05% by weight of the composition.

Particularly preferred surfactants for use herein include nonionic surfactants, in particular branched alcohol alkoxylates, more in particular 2-ethyl hexan-1-ol ethoxylated to a degree of from 4 to 6, and propoxylated to a degree of from 4 to 6, more preferably, the alcohol is first propoxylated and then ethoxylated, and 2-alkyl-1-alkanols such as alkoxylated $C_{10}$ guerbet alcohols with 1 to 14, preferably 2 to 8, more preferably 3 to 6 ethoxylate or ethoxylate-propoxylate units. Other particularly preferred non-ionic surfactants include linear alcohol alkoxylated nonionic surfactants with $C_8$, $C_{10}$, $C_{12}$, mixtures of $C_8$ to $C_{10}$, mixtures of $C_{10}$ to $C_{12}$, mixtures of $C_9$ to $C_{11}$ linear alkyl chain and 8 or less ethoxylate units, preferably 3 to 8 ethoxylate units. Most preferably the alkoxylated nonionic surfactant is selected from the group consisting of: 2-propylheptyl EO8 (Lutensol XL89-BASF); 2-propylheptyl EO5 (Lutensol XL50-BASF); $C_{10}$ alcohol EO5 (Lutensol ON 50-BASF); $C_{10}$ alcohol EO7 (Lutensol ON 70-BASF); $C_8$-$C_{10}$ alcohol EO5 (Novel 810 FD5 Sasol); $C_{10}$ alcohol EO4 (Novel 10-4 Sasol); and 2-ethyl-hexanol PO5EO6 (Ecosurf EH6-Dow).

Other particularly preferred surfactants for use here in include linear amine oxide surfactants, in particular $C_8$-$C_{12}$ dimethyl amine oxide, more in particular $C_{10}$ dimethyl amine oxide; alkyldimethylbetaine surfactants, more in particular N,N-dimethyl-N-dodecylglycine betaine (Empigen BB-Huntsman); alkyl glucamide surfactants such as N-alkyl-N-acylglucamide preferably N-decanoyl-N-methylglucamine, and the alkyl glucamide surfactants sold under the name of GlucoPure®, GlucoTain®, and GlucoWet® by Clariant; alkylpolyglucoside surfactants, more in particular $C_8$ to $C_{12}$ alkyl polyglucosides, more preferably $C_8$ to $C_{10}$ alkyl polyglucosides such as for example Triton CG50 (Dow).

pH Adjusting Agents

Depending on the targeted uses, a liquid formulation of the present invention for home care use may need appropriate pH condition. For example, if the liquid product is used in the kitchen area, a high pH product may be desired in order to effectively remove grease soils commonly found in the area. If the product is used in bathroom area, soap scum and hard water deposits may be the primary concern. In such case, a low pH product may be more appropriate for such a purpose. There is no limitation on the types of pH adjusting agents that can be added into the liquid composition of the present invention. Example of pH adjusting agents that can be used include, but are not limited to, triethanolamine, diethanolamine, monoethanolamine, sodium hydroxide, sodium carbonate, potassium hydroxide, potassium carbonate, calcium carbonate, citric acid, acetic acid, hydrochloric acid, sulfamic acid, sulfuric acid and the like.

Other than components mentioned above, additional functional components may be included in the composition of the present invention. Additional components include, but are not limited to, chelants, compatibilizers, coupling agents, corrosion inhibitors, rheology modifiers, fragrances, colorants, preservatives, UV stabilizers, optical brighteners, and active ingredient indicators.

Preferred compositions herein include compositions comprising:
i) from about 0.05% to about 2% by weight of the composition of octenidine dihydrochloride;
ii) from 0.1% to about 4% by weight of the composition of the polymer, preferably the polymer comprises monomers of trimethylammoniumpropylmethacrylamide chloride; of N-isopropylacrylamide; acrylic acid and/or methacrylic acid and salts thereof; and 2-acrylamido-2-methyl-1-propane-sulfonic acid; or a PEI having a molecular weight of from 10,000 to 40,000 Da;
iii) from 0.05% to 2% by weight of the composition of a surfactant selected from the group consisting of an amine oxide surfactant, a non-ionic surfactant and mixtures thereof, preferably a mixture of C10 dimethyl amine oxide and ethyl hexanol PO5EO6.
iv) from about 0.2% to about 3% by weight of the composition of a base, preferably monoethanolamine; and
v) from about 95% to 99% of water.

Preferred compositions herein include compositions comprising:
i) from about 0.05% to about 2% by weight of the composition of octenidine dihydrochloride;
ii) from 0.1% to about 4% by weight of the composition of the polymer, preferably the polymer comprises monomers of trimethylammoniumpropylmethacrylamide chloride; of N-isopropylacrylamide; acrylic acid and/or methacrylic acid and salts thereof; and 2-acrylamido-2-methyl-1-propane-sulfonic acid; or a PEI having a molecular weight of from 10,000 to 40,000 Da;
iii) from 0.05% to 2% by weight of the composition of a non-ionic surfactant;
iv) from about 0.2% to about 3% by weight of the composition of an acid, preferably citric acid; and
v) from about 95% to 99% of water.

Application of the Composition

The composition may be applied by a variety of means. If sprayed, the composition advantageously may be supplied in a conventional bottle with a sprayer. The sprayer can be a trigger sprayer. As an option to a trigger sprayer, an aerosol can also be used to deliver the liquid formulation on to surfaces. Additional application means include, but are not limited to, fogging, rolling, brushing, mopping, and using a wipe by a variety of application devices. It is within the scope of the present invention that wipe products can also be made comprising or pre-treated with the disinfectant formulation(s) of the present invention, for example, for off-the-shelf sale or use.

To disinfect a contaminated surface, spray the liquid formulation until the area is completely covered. The wet formulation subsequently may be wiped dry with a dry cloth or paper towel.

The invention also relates to an article treated with a disinfectant formulation in accordance with aspects of the invention.

EXAMPLES

Example 1: Table 1 shows compositions according to the invention (Compositions A to F). The compositions are used as hard surface disinfectant cleaners. They provide 24-hour residual self-sanitizing (RSS) performance in combination with excellent cleaning and good surface shine appearance. The ingredients are expressed as weight percentage of the total composition.

TABLE 1

Example RSS formulations based on the invention

|  | A | B | C | D | E | F |
|---|---|---|---|---|---|---|
| Octenidine dihydrogen chloride | 0.5 | 0.5 | 0.5 | 0.5 | 0.5 | 0.5 |
| Dodecyl dimethyl amine oxide | 0.5 | 0.5 | 0 | 0 | 0 | 0 |
| Decyl dimethyl amine oxide | 0 | 0 | 0.5 | 0.5 | 0 | 0 |
| N-decanoyl-N-methylglucamine | 0 | 0.5 | 0 | 0 | 0 | 0 |
| 2-ethylhexyl PO5EO6 | 0 | 0 | 0.5 | 0 | 0 | 0.5 |
| C11-15 secondary alcohol EO40 | 0.5 | 0 | 0 | 0.5 | 0 | 0 |
| C9-11 ethoxylated alcohol EO6 | 0 | 0.5 | 0 | 0 | 0 | 0 |
| N,N-Dimethyl-N-dodecylglycine betaine | 0 | 0 | 0 | 0.5 | 0 | 0 |
| Monoethanolamine | 0 | 0 | 0.5 | 0.5 | 0 | 0 |
| Triethanolamine | 0.5 | 0.5 | 0 | 0.5 | 0.5 | 0 |
| Poly(MAPTAC-AA-AMPS-NIPAM) | 0 | 0 | 1 | 0 | 0 | 0 |
| Poly(SPE) | 0 | 0 | 0 | 1 | 0 | 0 |
| Poly(DADMAC-AA) | 0 | 0 | 0 | 0 | 0 | 1 |
| Poly(DMAEMA-VP) | 1 | 0 | 0 | 0 | 0 | 0 |
| PEI | 0 | 0 | 0 | 0 | 1 | 0 |
| Poly(MAPTAC) | 0 | 1 | 0 | 0 | 0 | 0 |
| Citric acid | 0 | 0 | 0 | 0 | 0 | 2.5 |
| Fragrance | 0.1 | 0.1 | 0.1 | 0.1 | 0.1 | 0.1 |
| Water | Balance | Balance | Balance | Balance | Balance | Balance |
| pH | >9 | >9 | >9 | >9 | >9 | <5 |

Example 2: Performance of octenidine-containing compositions employing different polymers at 1.0% active (all other composition ingredients kept constant).

In the absence of any polymer (no polymer control), the composition fails to achieve 24-hour RSS and delivers a weaker cleaning performance vs the reference formulation.

Compositions containing polymers based on this invention all pass the 24 hr RSS test, whereas polymers outside of the invention scope, such as poly(2-ethyl oxazoline) (PEOX), do not pass.

The best performing composition across all three performance attributes (24 hr RSS, shine and cleaning) was that containing poly(MAPTAC-AA-AMPS-NIPAM).

TABLE 2

Example RSS formulations based on the invention

| Polymer (1.0%) | No polymer control | Poly (MAPTAC AA AMPS NIPAM) | Poly (MAPTAC AA Ethyl acrylate) | Poly (SPE) | Poly (DADMAC Am) | Poly (DMAEMA VP*) | PEOX |
|---|---|---|---|---|---|---|---|
| 24 hr RSS[1] | Fail | Pass | Pass | Pass | Pass | Pass | Fail |
| Shine grade[2] | 3-4 | 2-3 | 3-4 | >5 | 2-3 | >5 | >5 |
| Cleaning index vs ref (100)[3] | 86 | 211 | 121 | 127 | 110 | 40 | 113 |

*Vinyl pyrrolidone

[1]Protocol based on EPA01-1A (24 hr Residual Self-Santizing, 12 abrasion cycles) using *Enterobacter aerogenes* as the test organism and glass as the test surface. A pass result refers to at least 99.9% reduction (log 3) in bacteria at the end of the 12 abrasion regimes.

[2]Shine grade of black, glossy ceramic tiles after product application and wiping. Panelists visually assess the streaking appearance of the dried tiles according to the following scale; 0 = No streaks, 1 = Very slight streaks, 2 = Slight streaks, 3 = Slight to moderate streaks, 4 = Moderate streaks, 5 = Moderate to heavy streaks, 6 = Heavy streaks

[3]Cleaning of baked-on/polymerised grease on enamel surfaces. Formulations are applied to a sponge and the number of wiping strokes recorded for complete soil removal. The number of strokes is then indexed vs a standard hard surface cleaner (index 100), with a higher index implying better cleaning.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A disinfectant cleaning composition, substantially free of a quaternary ammonium antimicrobial active, the composition comprising:
    i) a bispyridinium alkane antimicrobial active;
    ii) a polymer comprising a first monomer, a second monomer, a third monomer, and a fourth monomer,
        wherein the first monomer is trimethylammoniumpropylmethacrylamide chloride,
        wherein the second monomer is N-isopropylacrylamide,
        wherein the third monomer is selected from the group consisting of acrylic acid, methacrylic acid, and salts thereof, and
        wherein the fourth monomer is 2-acrylamido-2-methyl-1-propane-sulfonic acid.

2. A composition according to claim 1 wherein the bispyridinium alkane antimicrobial active is octenidine dihydrochloride.

3. A composition according to claim 1 wherein the first, second, third, and fourth monomers are present in weight ratios of about 25 to about 45%, about 40 to about 70%, about 1 to about 15%, and about 1 to about 15%, based on 100% weight of the polymer.

4. The composition according to claim 1 comprising from about 0.1% to about 5% by weight of the composition of the polymer.

5. The composition according to claim 1 comprising from about 0.05% to about 5% by weight of the composition of the bispyridinium alkane antimicrobial active.

6. The composition according to claim 1 comprising from about 0.05% to about 5% by weight of the composition of a surfactant, wherein the surfactant is selected from the group consisting of alkyl polyglucoside, fatty alcohol alkoxylate, betaine, alkyl glucamine, alkyl glucamide, amine oxide and mixtures thereof.

7. The composition according to claim 1 comprising from about 0.1% to about 10% by weight of the composition of a pH adjusting agent.

8. The composition according to claim 1 comprising:
    i) from about 0.05% to about 2% by weight of the composition of octenidine dihydrochloride;
    ii) from 0.1% to about 4% by weight of the composition of the polymer;
    iii) from about 0.05% to about 2% by weight of the composition of a surfactant selected from the group consisting of an amine oxide surfactant, a non-ionic surfactant and mixtures thereof;
    iv) from about 0.2% to about 3% by weight of the composition of a pH adjusting agent; and
    v) from about 90% to about 99% of water.

9. The composition according to claim 1 wherein the composition imparts biocidal residuality to a surface.

10. An article treated with a composition according to claim 1 wherein the article is preferably in the form of a wipe or in the form of any disposable substrate.

* * * * *